(12) United States Patent
Kondoh

(10) Patent No.: US 11,310,374 B2
(45) Date of Patent: Apr. 19, 2022

(54) SYSTEM AND PROCESSING APPARATUS

(71) Applicant: SHARP KABUSHIKI KAISHA, Sakai (JP)

(72) Inventor: Katsuyoshi Kondoh, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 388 days.

(21) Appl. No.: 16/586,705

(22) Filed: Sep. 27, 2019

(65) Prior Publication Data
US 2020/0106896 A1  Apr. 2, 2020

(30) Foreign Application Priority Data
Oct. 2, 2018 (JP) .............................. JP2018-187436

(51) Int. Cl.
| | |
|---|---|
| *G10L 15/00* | (2013.01) |
| *H04N 1/00* | (2006.01) |
| *G10L 15/22* | (2006.01) |
| *G10L 15/30* | (2013.01) |

(52) U.S. Cl.
CPC ......... *H04N 1/00403* (2013.01); *G10L 15/22* (2013.01); *H04N 1/00395* (2013.01); *G10L 15/30* (2013.01); *G10L 2015/223* (2013.01); *G10L 2015/225* (2013.01)

(58) Field of Classification Search
CPC combination set(s) only.
See application file for complete search history.

(56) References Cited

FOREIGN PATENT DOCUMENTS

| | | |
|---|---|---|
| CN | 102431523 A | 5/2012 |
| JP | 2000-029585 A | 1/2000 |
| JP | 2005-219460 A | 8/2005 |

*Primary Examiner* — Vu B Hang
(74) *Attorney, Agent, or Firm* — ScienBiziP, P.C.

(57) ABSTRACT

This system includes: an apparatus; a first server; and a second server connectable to the apparatus and the first server. The first server includes a voice receiver that receives a voice from a user, a command transmitter that transmits a command based on the voice to the second server, and an output part that, responsive to a response signal received from the second server, provides an output based on the response signal. The second server includes a command processor that transmits a response signal to the first server responsive to a first command received from the first server, and that acquires a status of the apparatus, and a status transmitter that transmits a response signal based on the acquired status of the apparatus to the first server responsive to a second command received from the first server.

10 Claims, 14 Drawing Sheets

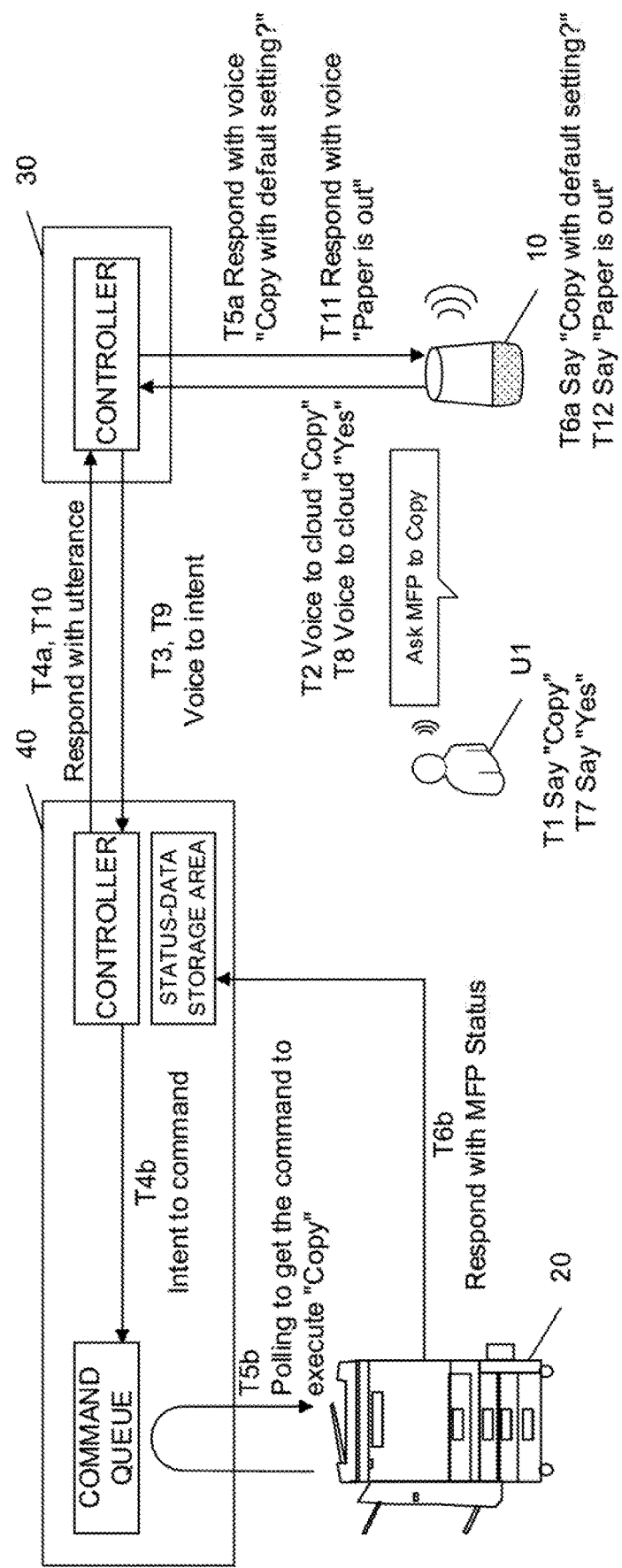

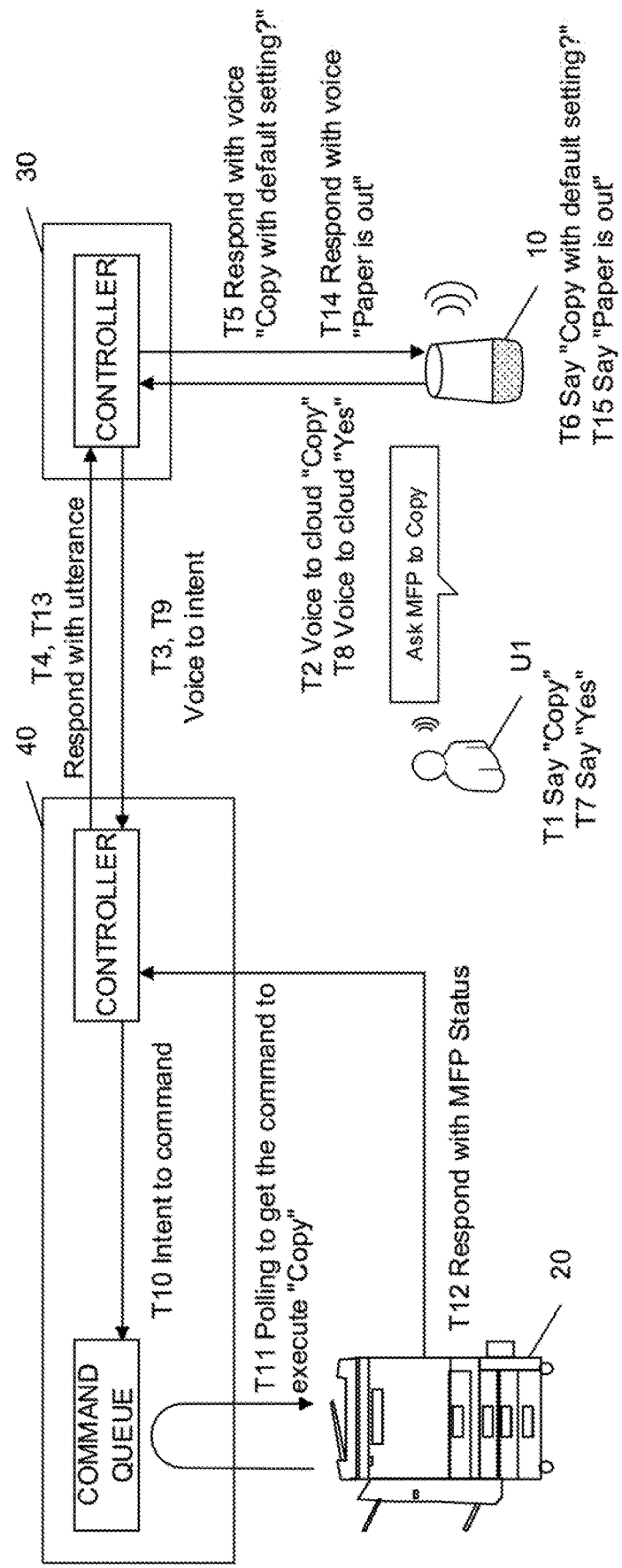

SYSTEM AND PROCESSING APPARATUS

BACKGROUND OF THE INVENTION

Field of the Invention

The present invention relates to a system and the like.

Description of the Background Art

In a background art, there has been proposed a technology in which an apparatus such as an image forming apparatus is operated by voice, or the input/output of a voice is changed in accordance with an operating status.

For example, an image processing apparatus, in which a voice for using a command is registered while a button, or the like, of an operating part is pressed so that an operation is enabled only by voice when the same command is used the next time, is proposed (see, for example, Japanese Unexamined Patent Application Publication No. 2000-29585). Furthermore, an image processing apparatus is proposed, which performs control by associating the timing of the voice input/output with the operating condition of an image forming apparatus, such as increasing the output volume from a voice input/output unit, prohibiting voice input, or increasing the sampling rate of voice data depending on the operating condition, or stopping the operation of the image forming apparatus while a voice is input or output (see, for example, Japanese Unexamined Patent Application Publication No. 2005-219460).

Nowadays, a voice command device makes it possible to operate an apparatus by voice without using a button, a switch, or the like. Therefore, it is conceivable that the voice input to the voice command device is converted into a command for the apparatus to perform a predetermined process, the command is acquired from the apparatus by polling, and the predetermined process is performed by the apparatus.

An apparatus such as an image forming apparatus sometimes enters a status (error) such as paper jam, paper out, or toner out. However, a voice command device or a server for operating the voice command device is not able to directly detect the status of the apparatus. Thus, there is a problem of the difficulty in giving a voice response in consideration of the status and the capability of the device and the status of an option.

Furthermore, in order to output the status of the apparatus from the voice command device, it is conceivable that, when the apparatus has executed a predetermined process or when the apparatus has not executed a predetermined process, the server for operating the voice command device is notified of the status of the apparatus as well as the execution result. In this manner, the server for operating the voice command device is capable of causing the voice command device to output the status of the apparatus by voice as a response based on the notified status. However, in order to output the status of the apparatus as a voice, the apparatus needs to execute a process based on input voice, which results in the problem of a slow voice response by the voice command device. A user feels uncomfortable because even if a command for causing the apparatus to execute a predetermined process is input to the voice command device by voice, the response to the input is not promptly returned from the voice command device.

In view of the problem described above, the present invention has an object to provide a system capable of appropriately outputting the status of an apparatus when a command is received from a user.

SUMMARY OF THE INVENTION

In order to solve the problem described above, the system according to an aspect of the present invention includes: an apparatus; a first server; and a second server connectable to the apparatus and the first server, wherein the first server includes a voice receiver that receives a voice from a user, a command transmitter that transmits a command based on the voice to the second server, and an output part that, responsive to a response signal received from the second server, provides an output based on the response signal, and the second server includes a command processor that transmits a response signal to the first server responsive to a first command received from the first server, and that acquires a status of the apparatus, and a status transmitter that transmits a response signal based on the acquired status of the apparatus to the first server responsive to a second command received from the first server.

A processing apparatus according to an aspect of the present invention connectable to an apparatus and a server capable of receiving a command, the processing apparatus including: a command acquirer that receives a command from the server; a command processor that, responsive to a first command received from the server, transmits a response signal to the server and acquires a status of the apparatus; and a status transmitter that, responsive to a second command received from the server, transmits a response signal based on the acquired status of the apparatus to the server.

With the system according to the present invention, responsive to a command received by a server from a user, it is possible to appropriately acquire the status of an apparatus coupled to the server and output the status of the apparatus to the user.

BRIEF DESCRIPTION OF THE DRAWINGS

FIG. 2 is a diagram that illustrates the outline of a process according to the first embodiment;

FIG. 3 is a diagram that illustrates the outline of a process in an example according to a related art;

DESCRIPTION OF THE PREFERRED EMBODIMENTS

Embodiments of the present invention are described below with reference to the drawings. In the embodiments, an explanation is given of, for example, a system in which a processing apparatus that executes processing based on a voice from a user is an image forming apparatus.

1. First Embodiment

1.1 Overall Configuration

Figure 1A:
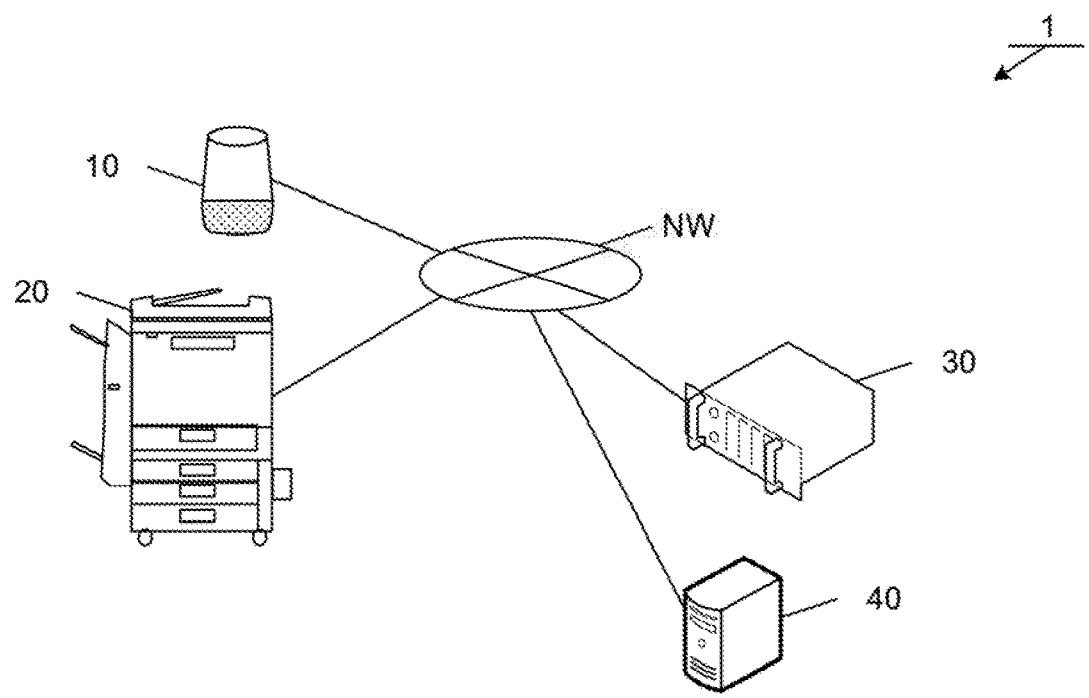
FIGS. 1A and 1B are diagrams that illustrate the overall configuration of a system according to a first embodiment of the present invention.

First, the overall configuration according to a first embodiment of the present invention is described. FIG. 1A is a diagram that illustrates a processing system 1 including a voice input/output device 10, an image forming apparatus 20, a voice-data recognition server 30 (first server), and a dialogue server 40 (second server). The voice input/output device 10, the image forming apparatus 20, the voice-data recognition server 30, and the dialogue server 40 are connected to one another via a network NW. It is assumed that the network NW is, for example, an external network such as the Internet; however, a local area network (LAN) or other communicative ways (e.g., a serial interface such as RS-232C) instead of a LAN may be used for the connection.

The voice input/output device 10 is a device that transmits a voice input from a user as voice data to the voice-data recognition server 30 and that outputs voice data transmitted from the voice-data recognition server 30 as a voice. The image forming apparatus 20 is an apparatus that performs predetermined processing based on a voice from the user.

The voice-data recognition server 30 is a server that generates an intent from the voice data received from the voice input/output device 10 and transmits it to the dialogue server 40. The intent according to the present embodiment is data representing the intension (action) of the sentence expressed as voice data. The intent is generated based on a sentence obtained by speech recognition on voice data. For example, it is determined that the user has the intention to make a "copy" based on the voice data such as "Make a copy with the MFP" or "Make a duplicate of this document", and the data "copy" is generated as an intent. The possible method for generating an intent from a sentence is a method for generating an intent based on whether a sentence includes a specific term (e.g., "copy") or a synonym of a specific term (e.g., "duplicate" as a synonym of "copy") or based on the format of the sentence. Furthermore, there is a possible method for generating an intent by extracting information (e.g., a keyword or a synonym of a keyword) contained in the sentence, by using a known natural language processing technique, or by using machine learning.

By representing voice data with an intent in the above manner, it is possible to respond with fluctuations of an expression in the voice input from the user. For example, as the utterance indicating the desire to make a copy with the image forming apparatus 20, expressions such as "Make a copy with the MFP", "I want to make a copy with the MFP", "I want the MFP to make a copy", "Make a duplicate of this document with the MFP" are possible. All the expressions are represented as "copy" that is an intent.

Furthermore, the voice-data recognition server 30 generates the intent corresponding to the intention of the sentence expressed as voice data. For example, when the user is giving utterance about copying, the user may give utterance indicating that the user wants to know how to use the processing system 1, such as "Teach me how to use it". In such a case, the voice-data recognition server 30 generates an intent (e.g., "help") indicating the desire to know the usage and transmits it to the dialogue server 40. In this way, the dialogue server 40 is capable of changing (branching) the process to be executed based on the type of intent received from the voice-data recognition server 30.

The intent may be text data, text data in JavaScript Object Notation (JSON) (registered trademark) format or Extensible Markup Language (XML) format, or binary data. That is, the intent may have any format as long as the format may indicate the intention based on voice data.

The dialogue server 40 is a server that generates a command based on the intent received from the voice-data recognition server 30. Here, the command according to the present embodiment refers to the data that is to be received by the image forming apparatus 20. The command may be a code such as a character string or a number indicating the setting of a specific function or an option or may be binary data. That is, the command may have any format as long as the format allows the image forming apparatus 20 to identify the process to be executed by the image forming apparatus 20.

Responsive to the intent received from the voice-data recognition server 30, the dialogue server 40 transmits a response signal including the data for a response to the voice-data recognition server 30 so as to make a response based on the intent. In this manner, a dialogue with the user is established by giving a response corresponding to the voice input from the user.

The image forming apparatus 20 receives one or more commands from the dialogue server 40 and executes a job. The job according to the present embodiment is a unit of a process executed by the image forming apparatus 20. For example, the image forming apparatus 20 executes the job to perform a copying process with the default settings based on the command for using a copy function and the command for using the default settings.

Figure 1B:
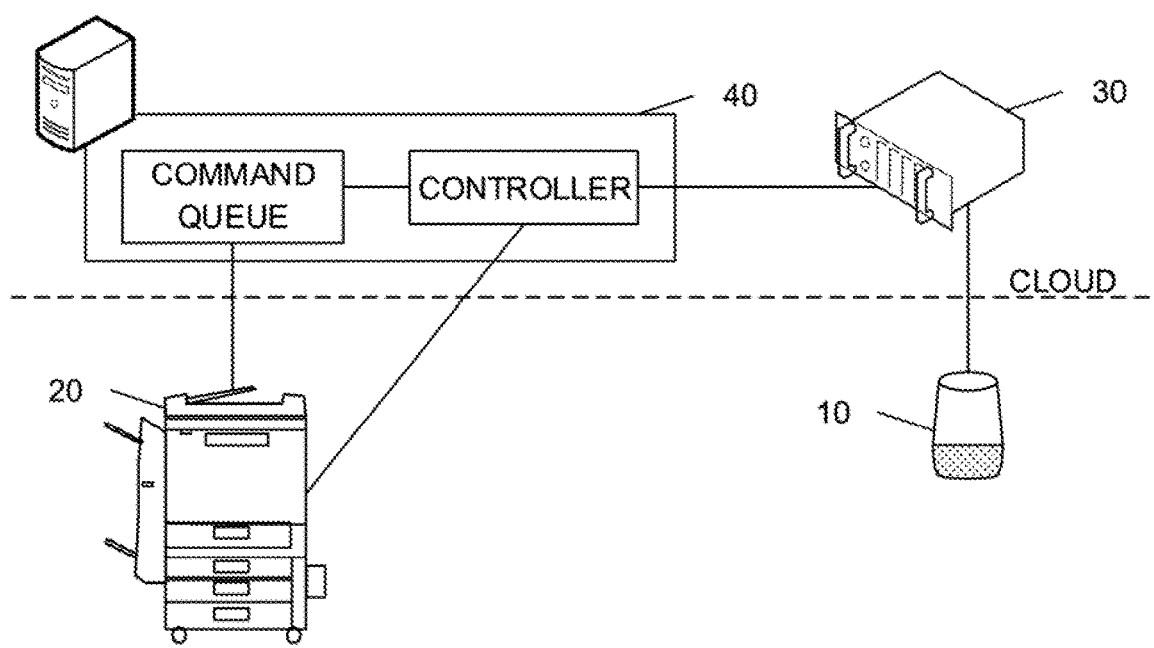

FIG. 1B is a diagram that illustrates the installation locations of the devices included in the processing system 1 and the relation in the transmission/reception destinations of data between the devices. As illustrated in FIG. 1B, as for the installation locations of the devices included in the processing system 1, the voice input/output device 10 and the image forming apparatus 20 may be installed at the place where the user is present. The voice-data recognition server 30 and the dialogue server 40 may be installed in the environment, what is called the cloud environment, where they may be used via the Internet, or may be installed in the place where the user is present. In the explanation according to the present embodiment, it is assumed that the voice-data recognition server 30 and the dialogue server 40 are installed in the cloud environment.

As for the relation in the transmission/reception destinations of data between the devices, the voice input/output device 10 transmits voice data to the voice-data recognition server 30, and the voice-data recognition server 30 generates an intent based on voice data and transmits it to the dialogue server 40. The dialogue server 40 generates a command based on the intent and stores it in a command queue.

The image forming apparatus 20 acquires the command stored in the command queue by polling. Specifically, the image forming apparatus 20 constantly transmits a command request to the dialogue server 40. After receiving the command request, the dialogue server 40 transmits a command to the image forming apparatus 20 that has transmitted the command request. After receiving the command, the image forming apparatus 20 executes a job based on the command if the job is executable. The image forming apparatus 20 may acquire a command by any method other than the one described above. For example, long polling or push transmission from the cloud (e.g., the dialogue server 40) by socket communication may be used.

Responsive to the acquisition of the command, the image forming apparatus 20 transmits, as a response, the status data indicating the status of the image forming apparatus 20 (for example, a status such as an error status, e.g., paper out or paper jam, capability information indicating the capability of the image forming apparatus 20, or option information indicating the status of an option of the image forming apparatus 20) to the dialogue server 40. The status data may be a code represented by a character string or a combination of numbers, textual information (for example, "paper is out") indicating a status, or binary data including information on a status. The status data may include additional information, such as the time when a predetermined status is set, the elapsed time since the predetermined status is set, or the information on the job that has caused the predetermined status. The status data may be information indicating multiple statuses when the image forming apparatus 20 are in multiple statuses, for example, a paper jam and a toner out occur. The capability information includes information on the function that is not changeable later, such as the availability of color printing, and the option information may include information on a function that is addable later, such as the availability of a staple function.

After receiving the status data from the image forming apparatus 20, the dialogue server 40 stores the received status data in a status-data storage area. As described above, the dialogue server 40 receives (acquires) the status data transmitted from the image forming apparatus 20 after generating the command based on the first intent (first command). Then, after receiving the second intent (second command), the dialogue server 40 transmits, to the voice-data recognition server 30, the data indicating a response based on the status data as a response signal based on the status data on the image forming apparatus 20. In this way, the dialogue server 40 may acquire the status data from the image forming apparatus 20 when the first intent is received. Thus, a response based on the status of the image forming apparatus 20 is possible based on the status data when the second intent is received. As the status data on the image forming apparatus 20 is already stored in the status-data storage area when the second and subsequent intents are received, a response corresponding to the status of the image forming apparatus 20 is possible. According to the present embodiment, a case where the second and subsequent intents are received is regarded as a case where the second intent (the second command) is received.

The image forming apparatus 20 may be configured not to transmit the status data to the dialogue server 40 when a command is received from the dialogue server 40. For example, regardless of the processing status of the dialogue server 40, the image forming apparatus 20 may transmit (push) the status data to the dialogue server 40. The dialogue server 40 may transmit a request to acquire the status data from the image forming apparatus 20, and the status data may be received from the dialogue server 40.

1.2 Outline of Process

The outline of a process according to the present embodiment is described with reference to FIG. 2. FIG. 2 is a diagram that illustrates a process in a case where a user U1 gives an instruction for copying with the image forming apparatus 20 (multifunction peripheral (MFP)). In the description, the image forming apparatus 20 is out of paper.

T1: Say "Copy"

The user U1 gives utterance "Make a copy with the MFP" so as to provide an input to the voice input/output device 10 with the voice including the command corresponding to the execution of copying in the image forming apparatus 20.

T2: Voice to Cloud "Copy"

The voice input/output device 10 converts the user U1's voice "Make a copy with the MFP" into voice data and transmits it to the voice-data recognition server 30 in the cloud environment.

T3: Voice to Intent

The voice-data recognition server 30 generates an intent based on the voice data. That is, the voice including the command from the user U1 is represented as the form of intent that is a form representing the command. The voice-data recognition server 30 transmits the generated intent to the dialogue server 40. For example, the intent "copy" is generated for the voice data "Make a copy with the MFP".

Then, after receiving the intent from the voice-data recognition server 30, the dialogue server 40 executes the following processes at T4a to T6a and T4b to T6b in parallel.

First, the processes at T4a to T6a are described.

T4a: Respond with Utterance

After receiving the intent, the dialogue server 40 generates response text data to inquire whether copying is conducted with the default setting as a response to the utterance and transmits it to the voice-data recognition server 30. That is, the dialogue server 40 transmits the response text data as a response signal to the voice-data recognition server 30.

T5a: Respond with Voice "Copy with Default Setting?"

The voice-data recognition server 30 generates voice data (voice data for outputting a voice to inquire of the user whether "the setting is default?") based on the response text data received from the dialogue server 40 and transmits it to the voice input/output device 10.

T6a: Say "Copy with Default Setting?"

The voice input/output device 10 outputs, as a voice, the voice data received from the dialogue server 40. As a result, the voice input/output device 10 outputs the voice "Is the setting default?".

Next, the processes at T4b to T6b are described.

T4b: Intent to Command

The dialogue server 40 generates a command from the intent. The generated command is stored in a command queue that is an area for storing a command. For example, the command "copy" is generated from the intent "copy".

T5b: Polling to Get the command to Execute "Copy"

The image forming apparatus 20 receives a command from the command queue in the dialogue server 40 by polling.

T6b: Respond with MVP Status

The image forming apparatus 20 executes the job based on the command if the job is executable and does not execute the job if it is not executable. Then, as a response to the received command, the image forming apparatus 20 transmits the execution result data of the job and the status data indicating the paper-out status of the image forming apparatus 20 to the dialogue server 40. The dialogue server 40 stores the received status data in the status-data storage area.

Next, an explanation is given of the outline of a process when the user U1 makes utterance in response to the voice output "Is the setting default?" from the voice input/output device 10.

T7: Say "Yes"

The user U1 gives utterance "Yes".

T8: Voice to Cloud "Yes"

The voice input/output device 10 converts the user U1's voice "Yes" into voice data and transmits it to the voice-data recognition server 30 in the cloud environment.

T9: Voice to Intent

The voice-data recognition server 30 generates an intent based on the voice data and transmits it to the dialogue server 40. For example, the intent "affirmation" indicating an affirmative response is generated for the voice data "Yes" from the user U1.

T10: Respond with Utterance

After receiving the intent, the dialogue server 40 reads the status data stored in the status-data storage area, generates response text data indicating that the image forming apparatus 20 is out of paper as a response to the utterance, and transmits it to the voice-data recognition server 30. That is, the dialogue server 40 transmits response text data based on the information (status data) on the status of the image forming apparatus 20 as a response signal to the voice-data recognition server 30. At this point, the dialogue server 40 may generate a command in parallel with the generation of the response text data in the same manner as when the first intent is received. For example, the dialogue server 40 may generate a command such as "the setting is default" when the intent "affirmative" is received in response to the inquiry "Is the setting default?".

T11: Respond with Voice "Paper is Out"

The voice-data recognition server 30 generates voice data (voice data for outputting the voice "paper is out") based on the response text data received from the dialogue server 40 and makes a response.

T12: Say "Paper is Out"

The voice input/output device 10 outputs, as a voice, voice data received from the dialogue server 40. As a result, the voice input/output device 10 outputs the voice "paper is out".

According to the present embodiment, when the dialogue server 40 receives the first intent (the first command, "copy" in the above example) from the voice-data recognition server 30 (T3), the dialogue server 40 generates response text data (T4a) and generates a command (T4b). After receiving the command generated by the dialogue server 40, the image forming apparatus 20 transmits status data to the dialogue server 40. When the dialogue server 40 receives the second intent (the second command, "affirmation" in the above example) (T9) from the voice-data recognition server 30, the dialogue server 40 may generate response text data based on the status data that has been already transmitted from the dialogue server 40 (T10). That is, the dialogue server 40 is capable of giving a response regarding the status of the image forming apparatus 20 without performing the process to inquire or acquire the status of the image forming apparatus 20. Therefore, while the voice input/output device 10 outputs "Is the setting default?" as a response to "Make a copy with the MFP" that is the first utterance of the user U1, the dialogue server 40 may acquire the status of the image forming apparatus 20. Thus, it is possible to respond with "paper is out" as a response to "Yes" that is the second utterance of the user U1.

FIG. 3 is a diagram that illustrates the outline of a process in a case according to the related art (an example according to the related art). Here, T4 to T6 of the process in the case according to the related art are the same as T4a to T6a in FIG. 2. As T1 to T9 of the process in the case according to the related art are the same as those in FIG. 2, the description is omitted, and the process at T10 to T15 is described.

T10: Intent to Command

The dialogue server 40 generates a command based on the intent received from the voice-data recognition server 30 and stores it in the command queue.

T11: Polling to Get the Command to Execute "Copy"

The image forming apparatus 20 acquires a command from the command queue in the dialogue server 40 by polling.

T12: Respond with MFP Status

The image forming apparatus 20 transmits, as a response to the received command, the status data indicating the status where the image forming apparatus 20 is out of paper to the dialogue server 40. The dialogue server 40 stores the received status data in the status-data storage area.

T13: Respond with Utterance

The dialogue server 40 generates response text data indicating that the image forming apparatus 20 is out of paper as a response to the utterance and transmits it to the voice-data recognition server 30.

T14: Respond with Voice "Paper is Out"

The voice-data recognition server 30 generates voice data (voice data for outputting the voice "Paper is out") based on the response text data received from the dialogue server 40 and gives a response.

T15: Say "Paper is Out"

The voice input/output device 10 outputs, as a voice, the voice data received from the dialogue server 40. As a result, the voice input/output device 10 outputs the voice "Paper is out".

As described above, in the case according to the related art, the polling from the image forming apparatus 20 is included in the process after the user says "Yes" to the voice input/output device 10 until the response is returned, which results in a slow response.

Figure 4:
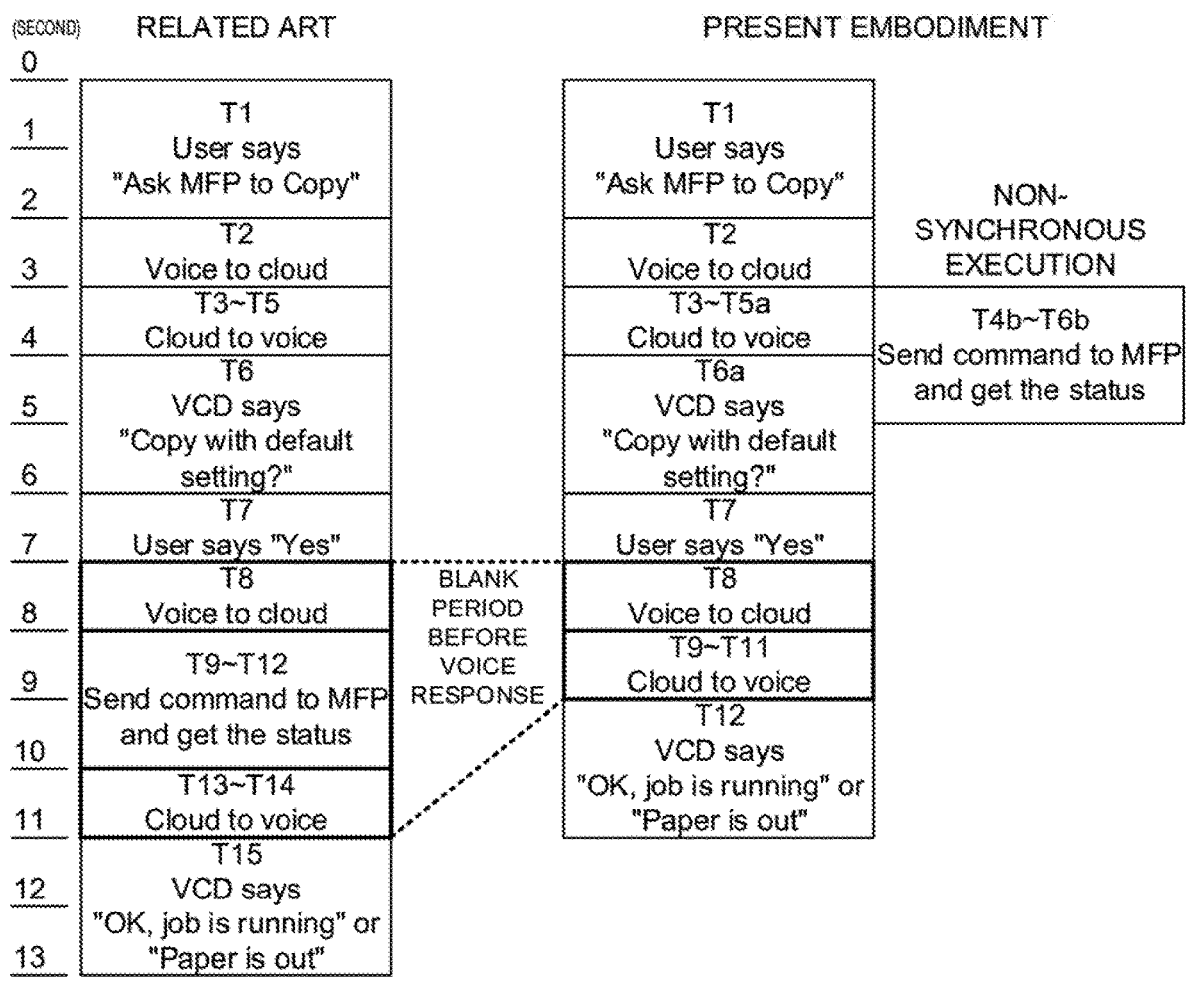
FIG. 4 is a diagram that illustrates a comparison between a process according to the first embodiment and a process in an example according to the related art.

FIG. 4 illustrates the processes arranged in chronological order in the case according to the related art and in the case according to the present embodiment. The reference numerals attached to FIG. 4 correspond to those in FIGS. 2 and 3.

Here, it takes two seconds for the user to say "Make a copy with the MFP", one second for the voice input/output device 10 to transmit voice data to the cloud environment, one second for the voice input/output device 10 to receive voice data as a response from the cloud environment, two seconds for the voice input/output device 10 to output the voice "Is the setting default?" as a response, one second for the user to say "Yes", and one second for the voice input/output device 10 to transmit voice data to the cloud environment again. It takes two seconds to transmit a command to the image forming apparatus 20 and receive execution result data and status data from the image forming apparatus 20. It takes one second to receive the voice data as a response from the cloud environment again.

In the case according to the related art, after the user says "Yes", processes are performed to transmit voice data to the cloud environment, receive status data from the image forming apparatus 20, and receive voice data as a response from the cloud environment again. Therefore, after the user says "Yes", there is a 4-second blank period before the voice input/output device 10 gives a response.

On the other hand, according to the present embodiment, after the voice data "Make a copy with the MFP" is transmitted to the cloud environment, the process to receive the status data from the image forming apparatus 20 is performed in a non-synchronous manner in parallel to the process to receive the voice data as a response from the cloud environment by the voice input/output device 10. Therefore, after the user says "Yes", the processes are performed to transmit the voice data to the cloud environment and to receive the voice data as a response from the cloud environment again based on the status data received from the image forming apparatus 20. Thus, the blank period after the user says "Yes" and before the voice input/output device 10 gives a response is two seconds.

As described above, the case according to the present embodiment, as compared with the case according to the related art, enables a reduction in a blank period in the case of responding with the status of the dialogue server 40, a quick response, and a response with desired usability.

1.3 Functional Configuration

1.3.1 Voice Input/Output Device

Figure 5:
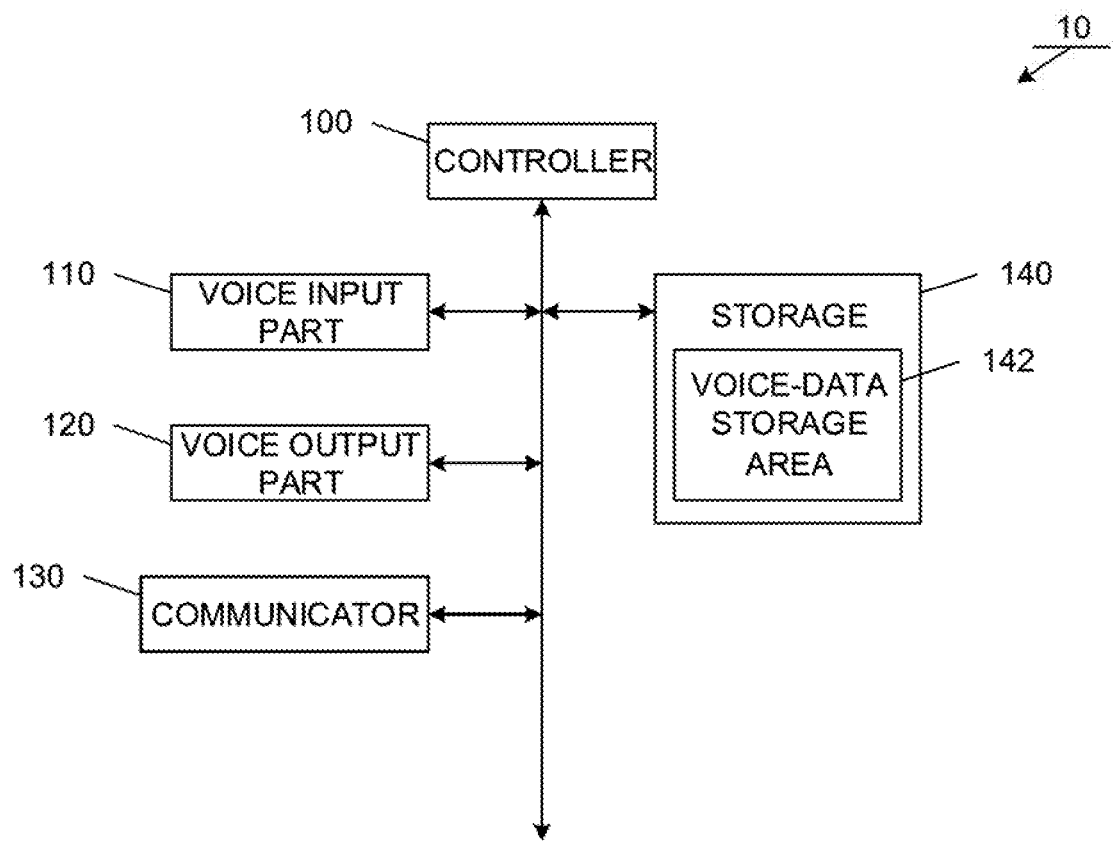
FIG. 5 is a diagram that illustrates a functional configuration of a voice input/output device according to the first embodiment.

The functional configuration of the voice input/output device 10 is described with reference to FIG. 5. As illustrated in FIG. 5, the voice input/output device 10 includes a controller 100, a voice input part 110, a voice output part 120, a communicator 130, and a storage 140.

The controller 100 is a functional part that controls the overall voice input/output device 10. The controller 100 reads and executes various programs to perform various functions, and it includes, for example, one or more arithmetic devices (central processing units (CPUs)).

The voice input part 110 is a functional part that converts a voice input from a voice input device (e.g., a microphone) into voice data and outputs it to the controller 100. The voice output part 120 is a functional part that converts voice data into a voice signal and outputs a voice via a voice output device (e.g., a speaker).

The communicator 130 is a functional part through which the voice input/output device 10 communicates with an external device. For example, the communicator 130 includes a Network Interface Card (NIC) used in a wireless LAN, or a communication module connectable to a Long Term Evolution (LTE)/LTE-Advanced (LTE-A)/License-Assisted Access using LTE (LAA)/5G line.

The storage 140 is a functional part that stores various programs and various types of data for the operation of the voice input/output device 10. The storage 140 includes, for example, a solid state drive (SSD), which is a semiconductor memory, an HDD, or the like. The storage 140 has a voice-data storage area 142 that is an area for storing voice data output from the voice input part 110.

1.3.2 Image Forming Apparatus

Figure 6:
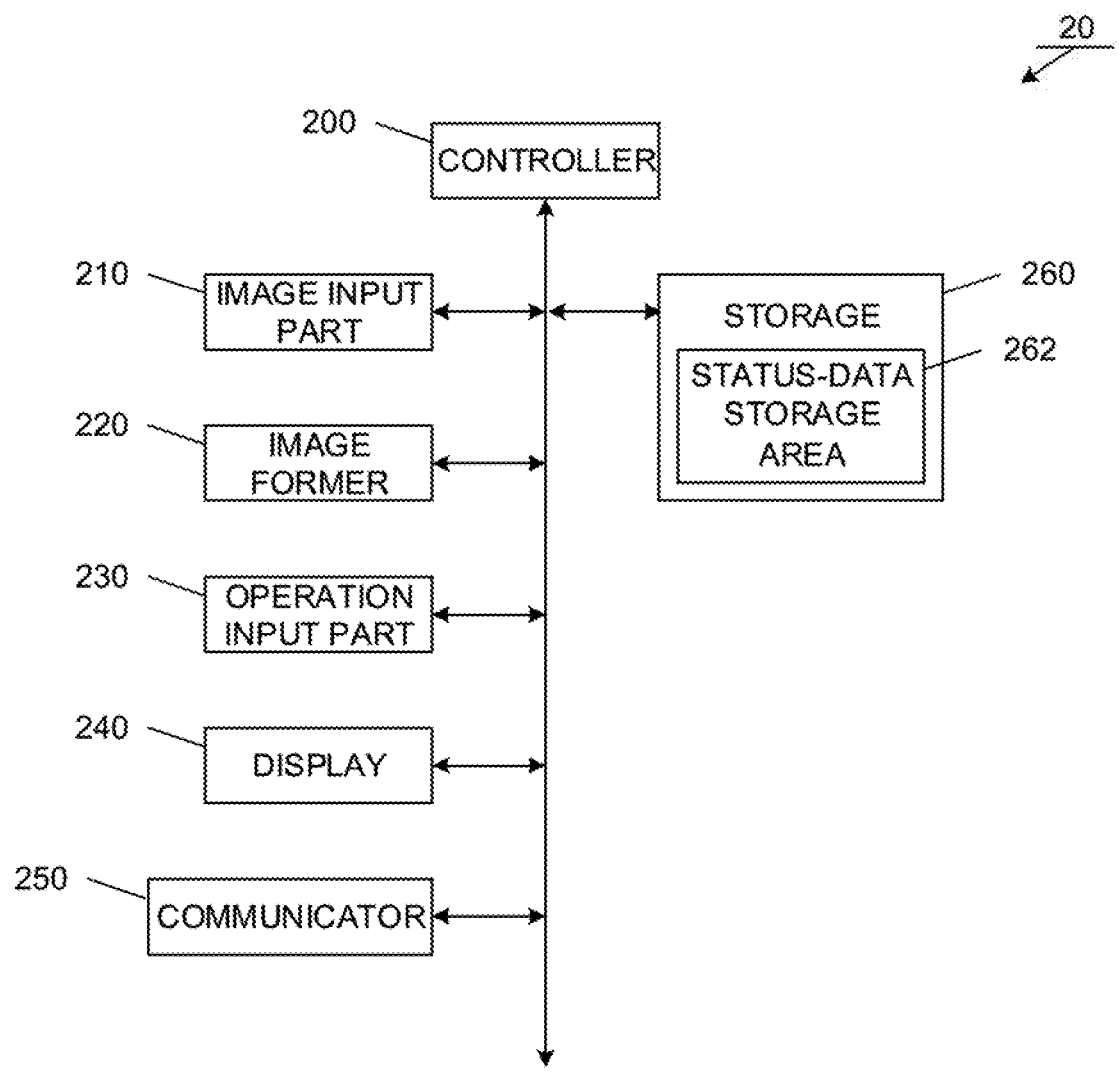
FIG. 6 is a diagram that illustrates a functional configuration of an image forming apparatus according to the first embodiment.

The functional configuration of the image forming apparatus 20 is described with reference to FIG. 6. As illustrated in FIG. 6, the image forming apparatus 20 includes a controller 200, an image input part 210, an image former 220, an operation input part 230, a display 240, a communicator 250, and a storage 260.

The controller 200 is a functional part that controls the overall image forming apparatus 20. The controller 200 reads and executes various programs to perform various functions, and it includes, for example, one or more arithmetic devices (CPUs) or the like.

The image input part 210 is a functional part that reads image data input to the image forming apparatus 20. The image input part 210 is coupled to a scanner that reads the image on a document so as to read image data output from the scanner. The image input part 210 may receive input (reception) of image data from a different terminal via the communicator 250 or receive document data from a storage medium such as a USB memory or an SD card.

The image former 220 is a functional part that forms output data based on the image data on a recording medium (e.g., a recording sheet). The image former 220 includes, for example, a laser printer using an electrophotographic method.

The operation input part 230 is a functional part that receives an instruction from the user, and it includes, for example, various key switches or a device that detects a touch input. The display 240 is a functional part that notifies the user of various types of information, and it includes, for example, a liquid crystal display (LCD). The image forming apparatus 20 may include a touch panel on which the operation input part 230 and the display 240 are integrally formed. In this case, the method for detecting an input to the touch panel may be a general detection method such as a resistive film method, an infrared method, an electromagnetic induction method, or a capacitance method.

The communicator 250 is a functional part through which the image forming apparatus 20 communicates with an external device. For example, the communicator 250 includes an NIC used in a wireless LAN or a communication module connectable to an LTE/LTE-A/LAA/5G line.

The storage 260 is a functional part that stores various programs and various types of data for the operation of the image forming apparatus 20. The storage 260 includes, for example, an SSD, which is a semiconductor memory, or an HDD. The storage 260 has a status-data storage area 262 that is an area for storing the status data indicating the status of the image forming apparatus 20. The status data is generated by the controller 200 and stored in the status-data storage area 262 when the status of the image forming apparatus 20 changes (for example, when the status of a paper jam occurs).

1.3.3 Voice-Data Recognition Server

Figure 7:
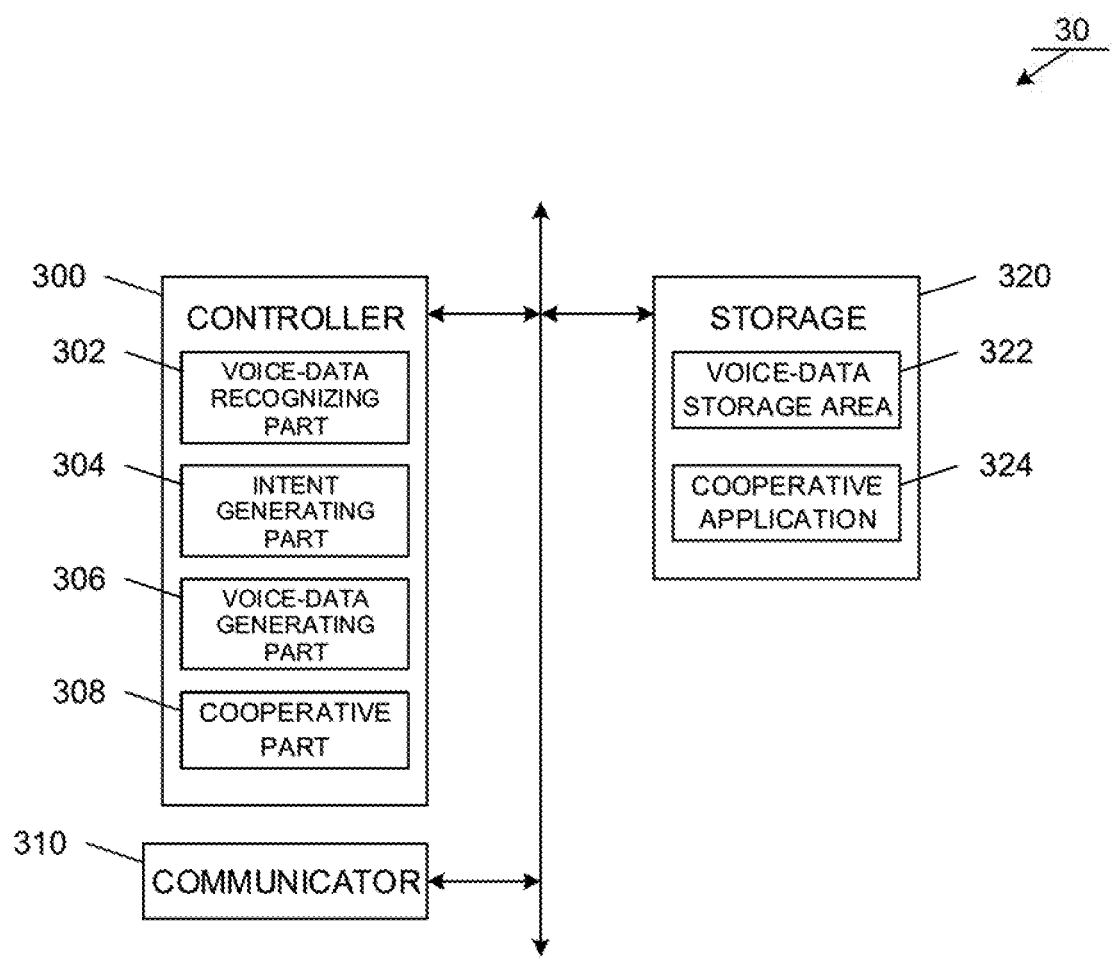
FIG. 7 is a diagram that illustrates a functional configuration of a voice-data recognition server according to the first embodiment.

The functional configuration of the voice-data recognition server 30 is described with reference to FIG. 7. As illustrated in FIG. 7, the voice-data recognition server 30 includes a controller 300, a communicator 310, and a storage 320.

The controller 300 is a functional part that controls the overall voice-data recognition server 30. The controller 300 reads and executes various programs to perform various functions, and it includes, for example, one or more arithmetic devices (CPUs).

The communicator 310 is a functional part through which the voice-data recognition server 30 communicates with an external device. For example, the communicator 310 includes an NIC used in a wireless LAN or a communication module connectable to an LTE/LTE-A/LAA/5G line.

The storage 320 is a functional part that stores various programs and various types of data for the operation of the voice-data recognition server 30. The storage 320 includes, for example, an SSD that is a semiconductor memory, or an HDD. The storage 320 stores a voice-data storage area 322 that is an area for storing voice data received from the voice input/output device 10 and a cooperative application 324 that transmits/receives data to/from the dialogue server 40.

Here, the controller 300 executes software (program) stored in the storage 320 to function as a voice-data recognizing part 302, an intent generating part 304, and a voice-data generating part 306. The controller 300 executes the cooperative application 324 to function as a cooperative part 308.

The voice-data recognizing part 302 is a functional part that recognizes voice data and outputs it as textual information to the controller 300. As the method for recognizing voice data, a well-known voice recognition technique may be used. The textual information output by the voice-data recognizing part 302 is referred to as "voice recognition data".

The intent generating part 304 is a functional part that generates an intent based on voice recognition data and outputs it to the controller 300. According to the method for generating an intent from voice recognition data, the intent is generated by, for example, previously storing the pattern of the user's utterance and comparing the pattern of the utterance with the voice recognition data. For example, the intent generating part 304 stores the pattern "Execute <job>" as a pattern for designating the job to be executed by the image forming apparatus 20. When the voice recognition data is "Execute copying", it is compared with the pattern for extracting a job so that it is possible to determine that <job> in the pattern corresponds to "copying" in the utterance. In this way, the intent generating part 304 may generate the intent indicating that copying is to be executed from the voice recognition data "Execute copying". By storing, as the pattern, additional patterns such as "I want to execute <job>" and "I want to make <job> executed", it is possible to respond with fluctuations of the user's utterance.

As a pattern regarding the setting of a job, patterns such as "I want to print <number> of copies", "I want to make a copy with paper of <paper size>", or "I want to make a copy in <color mode>" may be stored to generate an intent regarding the setting. Furthermore, the pattern of an answer to an alternative question, such as "Yes" or "No", may be stored to generate an intent regarding the user's selection.

According to the method for generating an intent, an intent may be generated by determining whether the textual information output from the voice-data recognizing part 302 includes a predetermined keyword. An intent may be generated by executing a structural analysis on textual information to extract predetermined information or may be generated by using machine learning.

The voice-data generating part 306 is a functional part that generates voice data to be output as a response to the user's utterance based on the response text data received from the dialogue server 40. The data indicating a response is, for example, the textual information representing, with texts, the voice to be output as a response. As a method for generating voice data from textual information, a known voice synthesis technique may be used.

The cooperative part 308 is a functional part that causes the voice-data recognition server 30 and the dialogue server 40 to cooperate with each other by transmitting an intent to the dialogue server 40 or receiving response text data from the dialogue server 40.

1.3.4 Dialogue Server

Figure 8:
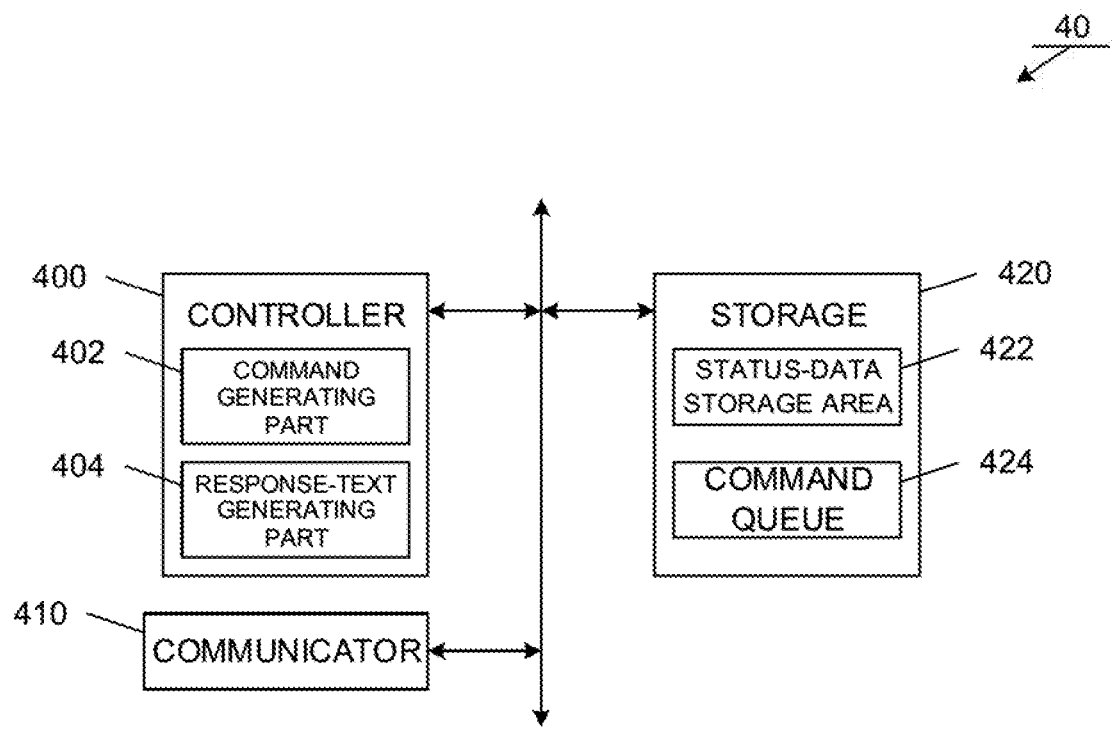
FIG. 8 is a diagram that illustrates a functional configuration of a dialogue server according to the first embodiment.

A functional configuration of the dialogue server 40 is described with reference to FIG. 8. As illustrated in FIG. 8, the dialogue server 40 includes a controller 400, a communicator 410, and a storage 420.

The controller 400 is a functional part that controls the overall dialogue server 40. The controller 400 reads and executes various programs to perform various functions and, for example, it includes one or more arithmetic devices (CPUs).

The communicator 410 is a functional part through which the dialogue server 40 communicates with an external device. For example, the communicator 410 includes an NIC used in a wireless LAN or a communication module connectable to an LTE/LTE-A/LAA/5G line.

The storage 420 is a functional part that stores various programs and various types of data for the operation of the dialogue server 40. The storage 420 includes, for example, an SSD, which is a semiconductor memory, or an HDD. The storage 420 has a status-data storage area 422 that is an area for storing status data received from the image forming apparatus 20 and a command queue 424 for storing a command generated by a command generating part 402 described later.

Here, the controller 400 executes software (program) stored in the storage 420 to function as the command generating part 402 and a response-text generating part 404.

The command generating part 402 is a functional part that generates a command based on the intent and outputs it to the command queue 424. To generate a command, for example, the data indicating the correspondence between a keyword and a command may be previously stored so that, when the tent includes a keyword, the command corresponding to the extracted keyword is generated.

The response-text generating part 404 is a functional part that generates response text data, which is textual information indicating the content of a response, based on the intent or the status data stored in the status-data storage area 422. For example, with regard to the intent for designating the job to be executed by the image forming apparatus 20, response text data such as "Is the setting default?", "How many copies are to be printed?", or "How is the scaling factor?" is generated. In a case where status data is stored in the status-data storage area 422, response text data based on the status data is generated, such as "paper is jammed" or "paper is out". When the image forming apparatus 20 executes a predetermined job, the response text data such as "Copying is being executed" is generated. In a case where the intent indicating a request to explain the usage, such as "Teach me how to use it" from the user is received, response text data regarding the usage of the processing system 1 may be generated.

1.4 Process Flow

Figure 9:
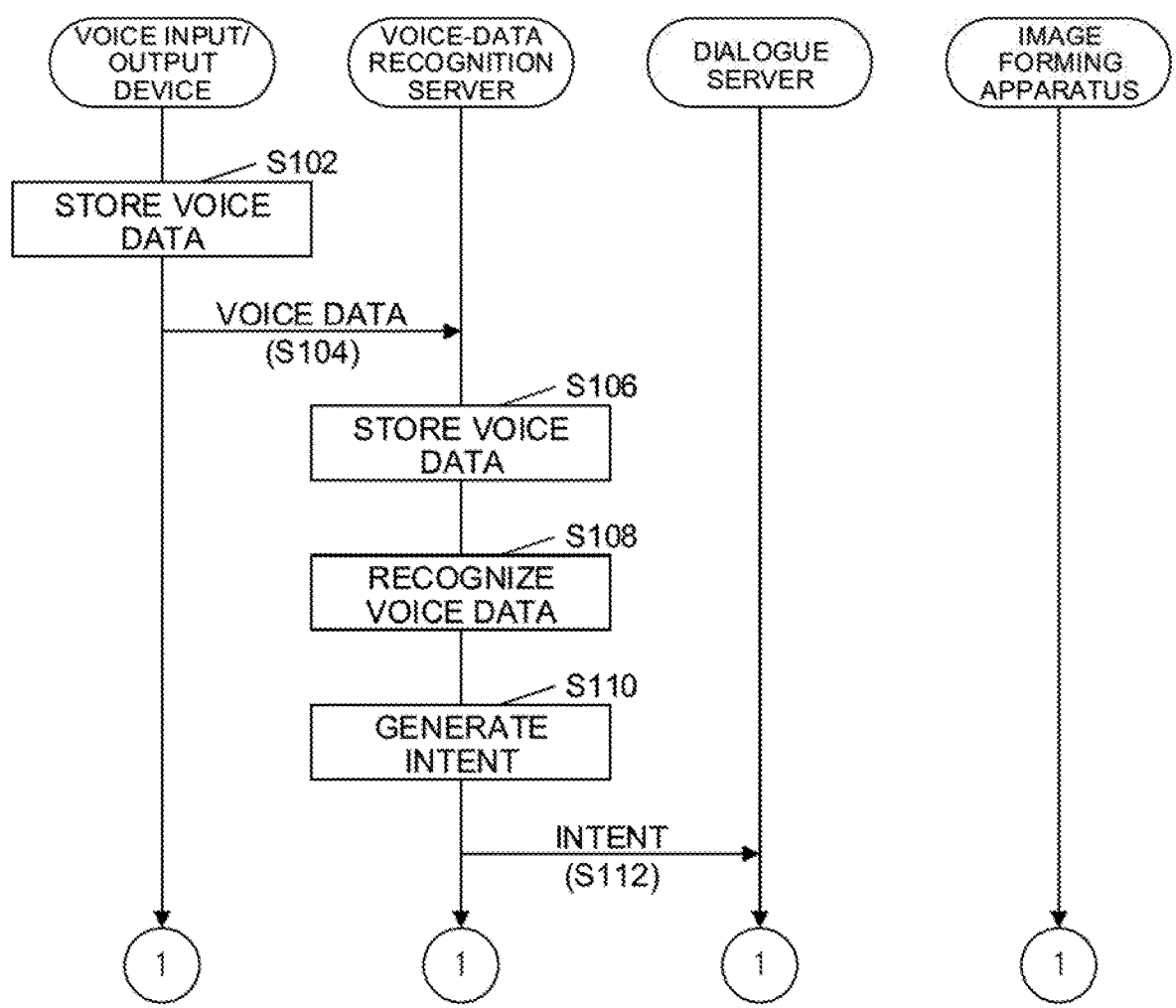
FIG. 9 is a sequence diagram according to the first embodiment.
Figure 10:
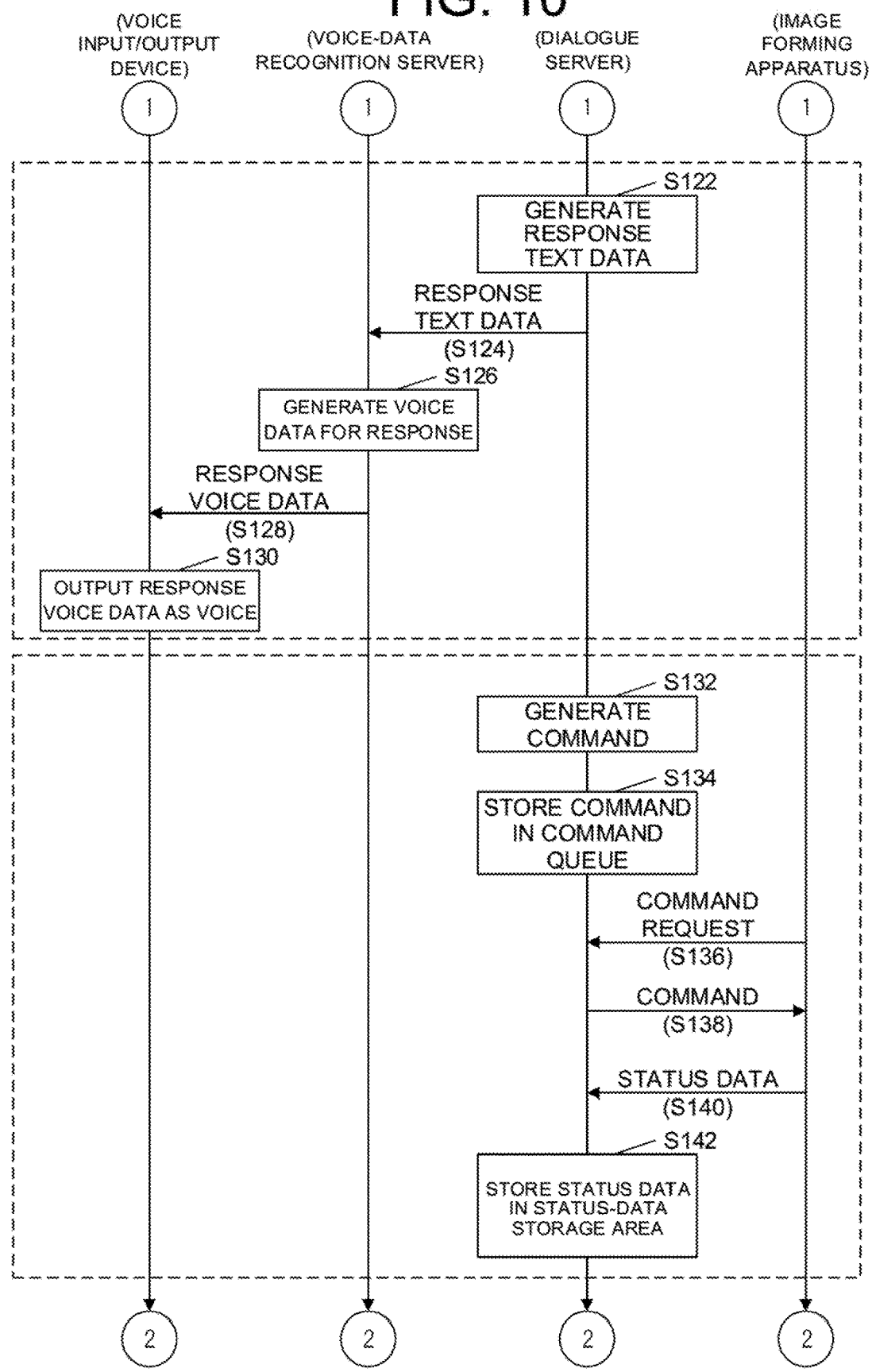
FIG. 10 is a sequence diagram according to the first embodiment.
Figure 11:
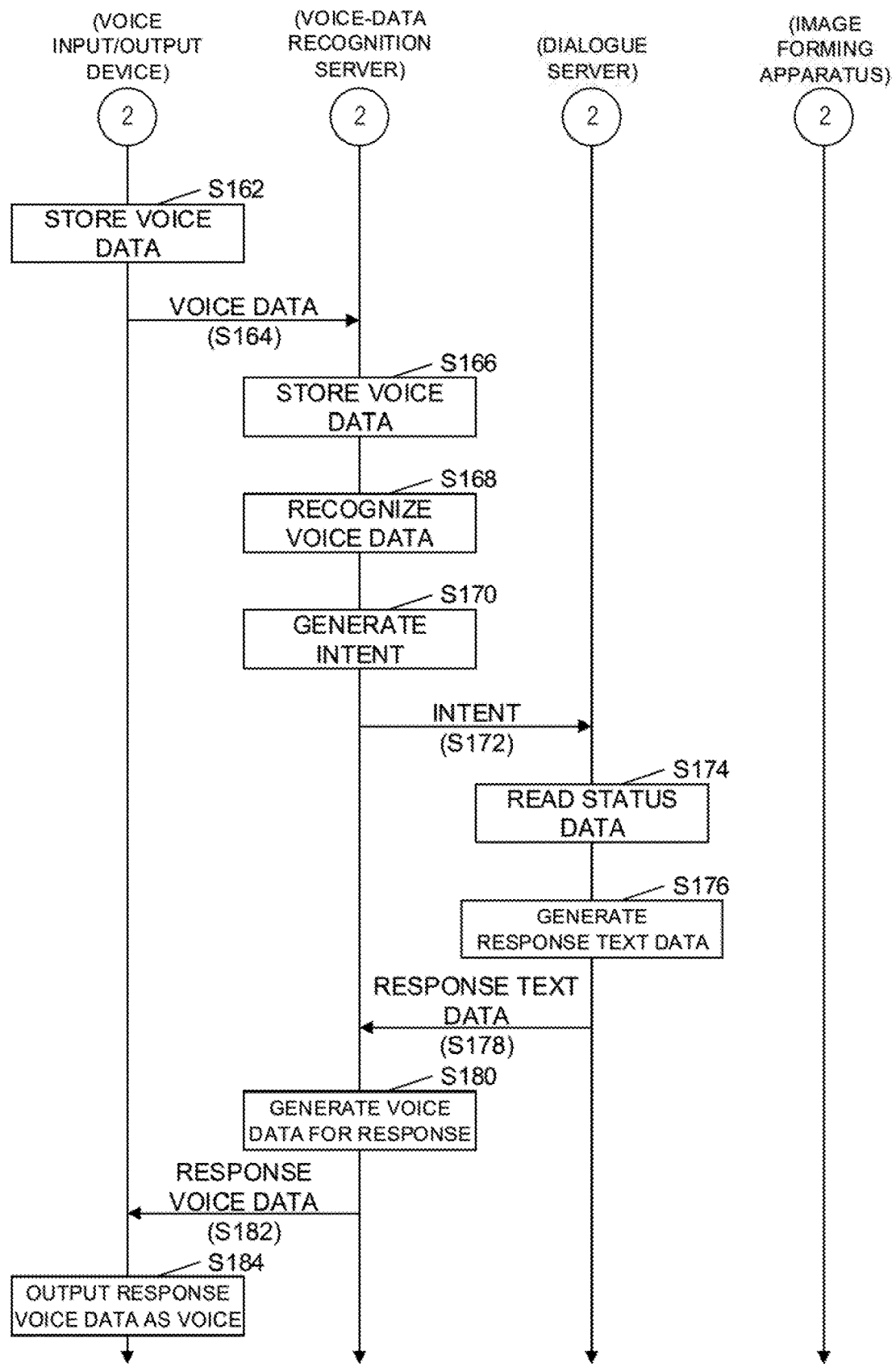
FIG. 11 is a sequence diagram according to the first embodiment.

Next, the flow of a process is described with reference to the drawings. FIGS. 9 and 10 illustrate a process in a case where no status data is stored in the status-data storage area 422, primarily, a process responsive to the user's first utterance. FIG. 11 illustrates a process in a case where status data is stored in the status-data storage area 422 and, primarily, a process responsive to the user's second and subsequent utterances.

First, with reference to FIG. 9, the voice input part 110 of the voice input/output device 10 stores the voice input by the user as voice data in the voice-data storage area 142 (S102). Then, the voice input/output device 10 transmits the voice data stored in the voice-data storage area 142 to the voice-data recognition server 30 via the communicator 130 (S104).

The controller 300 of the voice-data recognition server 30 stores the voice data received from the voice input/output device 10 via the communicator 310 in the voice-data storage area 322 (S106). Then, the controller 300 inputs the voice data to the voice-data recognizing part 302 to recognize the voice data through the voice-data recognizing part 302 (S108). The controller 300 inputs a recognition result data generated by the voice-data recognizing part 302 to the intent generating part 304 so as to generate an intent via the intent generating part 304 (S110). Then, the cooperative part 308 transmits the intent generated by the intent generating part 304 to the dialogue server 40 via the communicator 310 (S112).

Next, with reference to FIG. 10, the controller 400 of the dialogue server 40 inputs the intent to the response-text generating part 404 to generate response text data via the response-text generating part 404 (S122). The controller 400 transmits the response text data generated by the response-text generating part 404 to the voice-data recognition server 30 via the communicator 410 (S124). The cooperative part 308 of the voice-data recognition server 30 inputs the response text data to the voice-data generating part 306 to generate the voice data for a response (response voice data) (S126). Then, the cooperative part 308 transmits the response voice data generated by the voice-data generating part 306 to the voice input/output device 10 via the communicator 310 (S128). The voice output part 120 of the voice input/output device 10 outputs the response voice data as a voice (S130).

The controller 400 of the dialogue server 40 inputs the intent to the command generating part 402 to generate a command via the command generating part 402 (S132). The controller 400 stores the command generated by the command generating part 402 in the command queue 424 (S134).

On the other hand, the image forming apparatus 20 constantly executes polling to acquire a command stored in the command queue 424. The polling is conducted when the controller 200 transmits a command request to the dialogue server 40 via the communicator 250 (S136). In response to a received command request, the controller 400 transmits a command stored in the command queue 424 to the image forming apparatus 20 via the communicator 410 (S138).

With regard to the command received from the dialogue server 40, the controller 200 executes the job based on the command if the job is executable. Then, the controller 200 transmits the status data stored in the status-data storage area 262 together with the execution result data to the dialogue server 40 via the communicator 250 (S140). The controller 400 of the dialogue server 40 stores the status data received from the image forming apparatus 20 in the status-data storage area 422 (S142).

Here, the operations at S122 and S132 are performed in a non-synchronous manner in response to a received intent. In this way, the process from S122 to S130 and the process from S132 to S142 are performed in parallel. This allows the dialogue server 40 to acquire the status data on the image forming apparatus 20 while it gives a response to the user.

Next, with reference to FIG. 11, the voice input part 110 of the voice input/output device 10 stores the voice input by the user as voice data in the voice-data storage area 142 (S162). Then, the voice data stored in the voice-data storage area 142 is transmitted to voice-data recognition server 30 via the communicator 130 (S164). The voice-data recognition server 30 stores the voice data received from the voice input/output device 10 in the voice-data storage area 322 (S166). Then, the recognition of the voice data by the voice-data recognizing part 302 and the generation of an intent based on the recognition result by the intent generating part 304 are conducted (S168→S170). The cooperative part 308 transmits the intent to the dialogue server 40 (S172).

After receiving the intent, the controller 400 of the dialogue server 40 reads the status data stored in the status-data storage area 422 (S174). Then, the controller 400 generates response text data based on the status data via the response-text generating part 404 (S176). The controller 400 transmits the response text data to the voice-data recognition server 30 via the communicator 410 (S178).

The cooperative part 308 inputs the response text data to the voice-data generating part 306 to generate response voice data that is voice data for a response (S180). The cooperative part 308 transmits the response voice data to the voice input/output device 10 via the communicator 310 (S182). The voice output part 120 of the voice input/output device 10 outputs the response voice data as a voice (S184).

Even when the second intent is received from the voice-data recognition server 30 and response text data based on the status data is generated by the response-text generating part 404, the command generating part 402 generates a command based on the intent and stores it in the command queue 424. This allows the command generating part 402 to generate a command based on the received intent even when the second intent is received. The generated command is acquired by the image forming apparatus 20. The image forming apparatus 20 executes a job when the command for executing the job has been acquired. When a command is received from the dialogue server 40, the image forming apparatus 20 transmits the status data. Thus, the dialogue server 40 may update the status data on the image forming apparatus 20 and generate appropriate response text data.

Although an explanation is given based on the assumption that the processing apparatus that executes a predetermined process based on the user's voice is the image forming apparatus 20, the processing apparatus may be other than the image forming apparatus. That is, the present embodiment is applicable as long as the processing apparatus is an apparatus that performs a predetermined process through the interaction with a user and has a predetermined status. For example, when the processing apparatus is a display device for digital signage, the content displayed on the display device may be controlled by voice, and the status of the content (e.g., the presence or absence of the content to be displayed) may be output by voice. When the processing apparatus is a terminal device for teleconference, the connection status of a camera coupled to the terminal device may be output by voice.

According to the embodiment of the present invention, when the second server receives the first command transmitted from the first server, the second server transmits a response signal to the first server and, in parallel, acquires the status of the apparatus. When the second server receives the second command transmitted from the first server, the second server transmits a response signal based on the already acquired status of the apparatus to the first server. Then, the first server provides an output based on the response signal. Thus, when the second voice based on the response to the first voice is received from the user, it is possible to transmit the status of the apparatus acquired by the second server when the first voice is received. In a case where the user uses a voice command device, the status of the apparatus previously acquired from the voice command device is promptly output when the second voice is input. In this way, quick and high-usability responses are achieved.

Furthermore, it is possible to prevent a user from feeling uncomfortable about slow responses.

2. Second Embodiment

Figure 12:
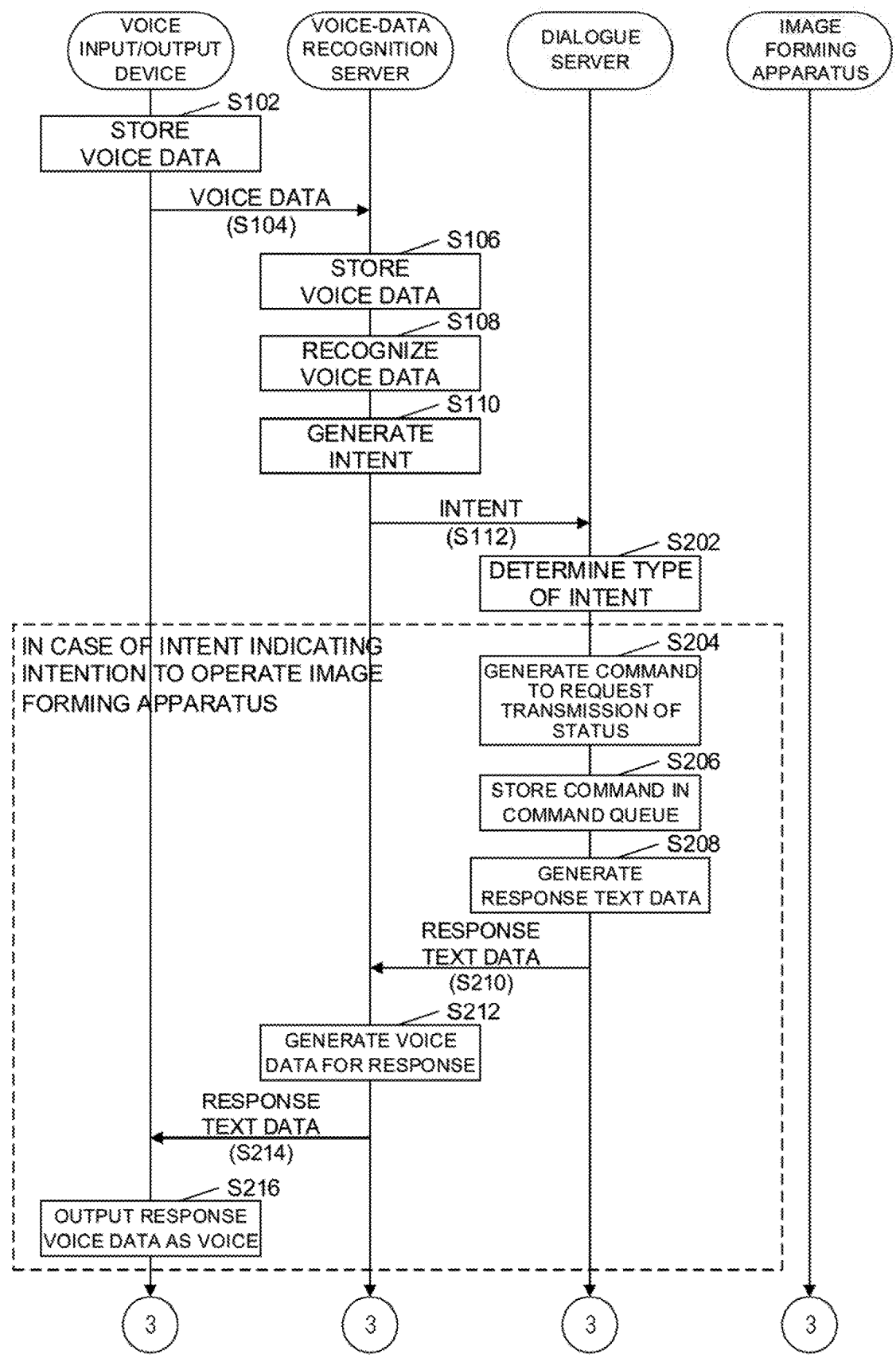
FIG. 12 is a sequence diagram according to a second embodiment of the present invention.

Next, a second embodiment of the present invention is described. The second embodiment is different from the first embodiment in that the image forming apparatus 20 transmits status data to the dialogue server 40 when the user's utterance is not the utterance regarding the command corresponding to a specific process such as copying but the utterance indicating the intention to operate the image forming apparatus 20. FIGS. 9 and 10 in the first embodiment are replaced with FIGS. 12 and 13 in the second embodiment. The same functional parts and the same processes are attached with the same reference numerals, and descriptions thereof are omitted.

With reference to the drawings, the flow of a process is described. First, with reference to FIG. 12, the voice-data recognition server 30 generates an intent based on the voice data received from the voice input/output device 10 and transmits the intent to the dialogue server 40 (S102 to S112).

In this description, it is assumed that the user gives utterance indicating the intention to operate the image forming apparatus 20. The intent generating part 304 generates the intent indicating the intention to operate the image forming apparatus 20. Then, the cooperative part 308 transmits the intent indicating the intention to start up an application to the dialogue server 40. The possible utterance indicating the intention to operate the image forming apparatus 20 is, for example, "I want to use the MFP", "Call the MFP", "Start up the MFP", or "Open the MFP". That is, the utterance does not indicate the specific process to be executed although the utterance has the content indicating the intention to operate (use) the image forming apparatus 20.

Then, the controller 400 determines the type of intent received from the voice-data recognition server 30 (S202). When the type of intent is an intent indicating the intention to operate the image forming apparatus 20, the command generating part 402 generates the command "status transmission", which is a command to request the image forming apparatus 20 to transmit the status of the image forming apparatus 20 (S204). The controller 400 stores the command generated by the command generating part 402 in the command queue 424 (S206). When the intent is an intent (e.g., "copy") indicating the execution of a specific process as a result of the determination on the type of intent at S202, the command generating part 402 may generate a command corresponding to the specific process as described in the first embodiment.

The response-text generating part 404 generates response text data (S208). At this point, it is not clear as to what operation the user is to perform with the image forming apparatus 20, and therefore the text data prompting the user to give utterance regarding the operation may be generated as response text data. For example, the response-text generating part 404 generates response text data such as "What kind of processing do you desire?".

The controller 400 transmits the response text data to the voice-data recognition server 30 via the communicator 410 (S210). The cooperative part 308 of the voice-data recognition server 30 generates response voice data based on the response text data via the voice-data generating part 306 and transmits it to the voice input/output device 10 (S212→S214). The voice output part 120 of the voice input/output device 10 outputs the response voice data as a voice (S216).

As is the case with the first embodiment, the controller 400 may execute the command generation (S204) and the response text generation (S208) in a non-synchronous manner.

Figure 13:
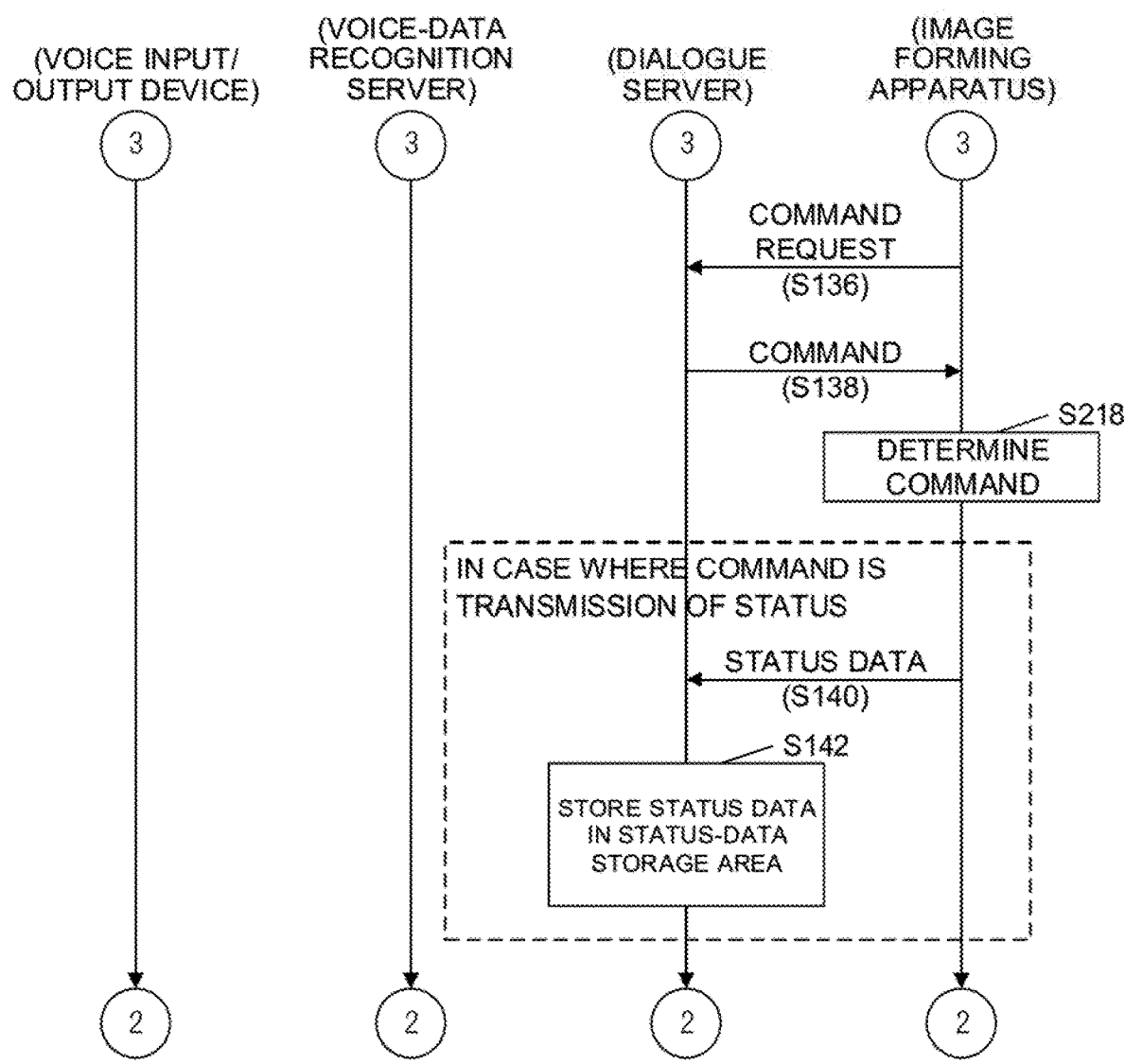
FIG. 13 is a sequence diagram according to the second embodiment.

Next, with reference to FIG. 13, the image forming apparatus 20 constantly transmits a command request to the dialogue server 40 to acquire a command stored in the command queue 424, thereby conducting polling to acquire the command (S136). After receiving the command request, the controller 400 transmits the command stored in the command queue 424 to the image forming apparatus 20 via the communicator 410 (S138).

After receiving a command from the dialogue server 40, the controller 200 of the image forming apparatus 20 determines which command has been received (S218). In a case where the received command is "status transmission", the controller 200 transmits the status data stored in the status-data storage area 262 to the dialogue server 40 via the communicator 250 (S140). The dialogue server 40 stores the status data received from the image forming apparatus 20 in the status-data storage area 422 (S142). As the status data on the image forming apparatus 20 is stored in the dialogue server 40 at this point, the process from S162 to S184 illustrated in FIG. 11 may be performed when the user further gives utterance. In a case where the received command is not "status transmission", the controller 200 executes the job based on the command received from the dialogue server 40 if the job is executable in the same manner as in the first embodiment. Then, the controller 200 transmits the status data stored in the status-data storage area 262 together with the execution result data to the dialogue server 40 via the communicator 250.

In this manner, the dialogue server 40 may give a response based on the status of the image forming apparatus 20 when the user gives a response (e.g., "I want to make a copy") to the voice output (e.g., "What kind of processing do you desire?") from the voice input/output device 10.

According to the present embodiment, even in a case where a specific command is not generated during the first interaction, the status of the image forming apparatus 20 may be given as a response during the second interaction.

3. Third Embodiment

Next, a third embodiment of the present invention is described. The third embodiment is different from the first embodiment in that a response is changed depending on whether the generated command is related to the status data, that is, whether the job based on the command is executable due to the status of the image forming apparatus 20. FIG. 11 in the first embodiment is replaced with FIG. 14 in the third embodiment. The same functional parts and processes are attached with the same reference numeral, and descriptions thereof are omitted.

Figure 14:
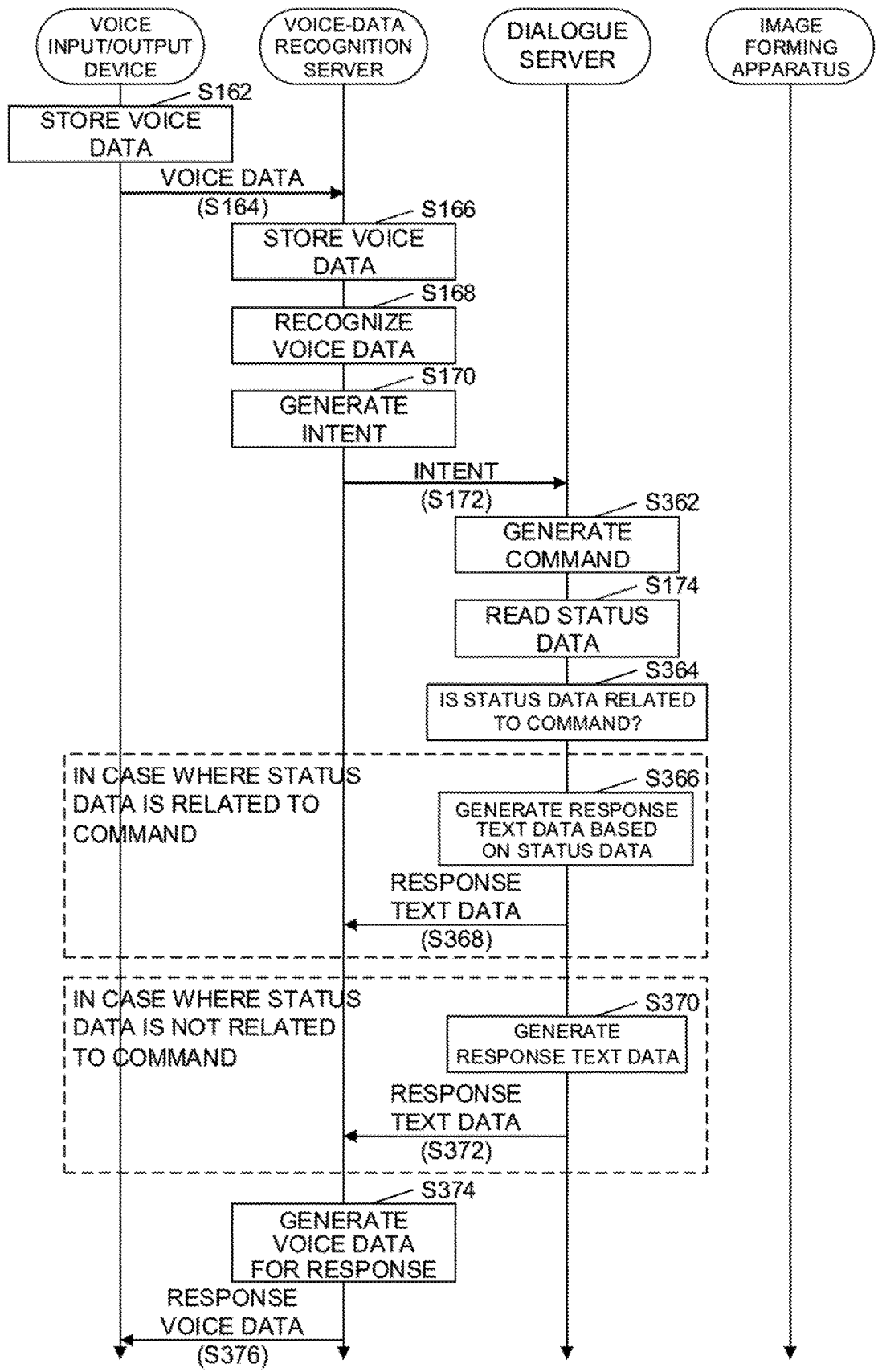
FIG. 14 is a sequence diagram according to a third embodiment of the present invention.

The flow of a process is described with reference to the drawing. It is assumed that status data is already stored in the status-data storage area 422. With reference to FIG. 14, the command generating part 402 generates a command based on an intent after receiving the intent from the voice-data recognition server 30 (S362). Then, the controller 400 compares the status data stored in the status-data storage area 422 with the generated command to determine whether the status data is related to the command (S364). According to the present embodiment, a case where status data is related to a command refers to a case where the status (e.g., an error status) of the image forming apparatus 20 affects the execution of the job based on the command generated by the command generating part 402. Specifically, a case where the status data is related to the command refers to a case where it is difficult for the image forming apparatus 20 to execute the job based on a command due to the status of the image forming apparatus 20. For example, when the image forming apparatus 20 is out of paper, the copy job based on a copy command is not executable. Therefore, the status in which the image forming apparatus 20 is out of paper is related to the copy command. Conversely, as the scan job based on the scan command is executable even when paper is out, the status in which the image forming apparatus 20 is out of paper is not related to the scan command.

In a case where the status data is related to the command, the response-text generating part 404 generates response text data based on the status data (S366). The controller 400 transmits the response text data to the voice-data recognition server 30 (S368).

In a case where the status data is not related to the command, the response-text generating part 404 generates response text data prompting the user to give utterance or generates response text data indicating that the image forming apparatus 20 is executing the job (S370). The controller 400 transmits the response text data to the voice-data recognition server 30 (S372).

In this manner, it is possible to change response text data (response signal) depending on whether the status of the image forming apparatus 20 is related to the command. In a case where the status of the image forming apparatus 20 is related to the command generated at S362 based on the status data stored in the status-data storage area 422, the controller 400 may refrain from transmitting the generated command to the image forming apparatus 20. For example, when the controller 400 receives a command request from the image forming apparatus 20, the controller 400 transmits only the command that is not related to the status of the image forming apparatus 20 among the commands stored in the command queue 424. The controller 400 may delete a command related to the status of the image forming apparatus 20 from the commands stored in the command queue 424. When the command generating part 402 generates a command, the controller 400 may determine whether the generated command is related to the status of the image forming apparatus 20. In a case where the command generated by the command generating part 402 is related to the status of the image forming apparatus 20, the controller 400 may prevent, the generated command from being stored in the command queue 424. In this way, the controller 400 selectively transmits a command to the image forming apparatus 20 depending on the status of the image forming apparatus 20, whereby it is possible to prevent the transmission of a command inexecutable by the image forming apparatus 20. In a case where the command generated by the command generating part 402 is not related to the status of the image forming apparatus 20, the controller 400 stores the command generated by the command generating part 402 in the command queue 424. A command stored in the command queue 424 is acquired by the image forming apparatus 20. Thus, the image forming apparatus 20 is capable of acquiring only commands that are not related to the status of the image forming apparatus 20.

When it is determined that the parameter of the job is not executable based on the status data (the status, the capability, or option information of the image forming apparatus), the response text data indicating that the parameter is inexecutable is generated and transmitted to the voice-data recognition server 30, and the display information regarding the inexecutable parameter is transmitted to the image forming apparatus 20. The controller 400 may cause the display 240 to present the display (e.g., a warning display such as "color copying is disabled" or "staple printing function is not provided") based on the display information.

The cooperative part 308 generates voice data via the voice-data generating part 306 based on the response text data and transmits it to the voice input/output device 10 (S374). The voice output part 120 of the voice input/output device 10 outputs the response voice data as a voice (S376).

For example, in a case where the image forming apparatus 20 is out of paper and a command regarding copying is generated, the response "No paper" is given. In a case where the job to be executed is a job regarding scan, however, the scan job is executable.

In a case where the B5-size paper is out and a command regarding copying is generated, a copy job is executed for copying with the A4-size paper, and the response "There is no paper" is given for copying with the B5-size paper.

In a case where a command including color copying or staple printing command is generated although the image forming apparatus 20 does not have the color printing capability or the staple printing option, a voice response such as "color copying is disabled" or "the staple printing function is not provided" is given, and a warning is displayed on the display of the image forming apparatus 20. However, in a case where the command of the job to be executed does not include a color copying or staple printing command, the job is executable.

According to the present embodiment, by comparing the status of the image forming apparatus 20 with the command, the status of the image forming apparatus 20 may be given as a response when the status of the image forming apparatus 20 is related to the command. Furthermore, when the job based on the command is executable, the job may be executed continuously. Thus, according to the present embodiment, the status of the image forming apparatus 20 may be flexibly given as a response, or the job may be executed in the image forming apparatus 20.

4. Modification

The present invention is not limited to the above-described embodiments, and various modifications are possible. Specifically, the technical scope of the present invention includes embodiments obtained by combining technical ways that are appropriately modified without departing from the scope of the present invention.

Partly, the above-described embodiments are described separately from each other for convenience of explanation; it is, however, obvious that they may be implemented in combination in a technically possible range. For example, the first embodiment, the second embodiment, and the third embodiment may be combined, in which case, even though the first user's utterance does not correspond to a specific command, the status of the image forming apparatus is given as a response when the second utterance is made. In a case where the status of the image forming apparatus is not related to the command, the image forming apparatus may execute the job.

A program that operates in each device according to the embodiment is a program that controls the CPU, or the like (a program that causes the computer to function) so as to perform the function according to the above-described embodiment. Information manipulated by the devices is temporarily stored in a temporary storage device (e.g., RAM) during processing, stored in various storage devices such as read only memory (ROM) and HDD, read by the CPU as needed, and then corrected or written.

Here, the recording medium for storing a program may be any medium, such as a semiconductor medium (e.g., a ROM or a non-volatile memory card), an optical recording medium/magneto-optical recording medium (e.g., Digital Versatile Disc (DVD), Magneto Optical Disc (MO), Mini Disc (MD), Compact Disc (CD), or Blu-ray Disc (BD) (registered trademark), or a magnetic recording medium (e.g., magnetic tape or flexible disk). Furthermore, the functions according to the above-described embodiment may be performed by executing the loaded program, and functions according to the present invention may be also performed by executing processing in cooperation with the operating system or other application programs based on a command of the program.

For distribution in the market, the program may be stored and distributed in a portable recording medium or may be transferred to a server computer connected via a network such as the Internet. In this case, it is obvious that a storage device of the server computer is also included in the present invention.

What is claimed is:

1. A system comprising:
an apparatus;
a first server; and
a second server connectable to the apparatus and the first server, wherein
the first server includes
a first receiver that receives a voice from a user,
a first transmitter that transmits a command based on the voice to the second server, and
an output part that, responsive to a response signal received from the second server, provides an output based on the response signal, and
the second server includes
a controller that transmits a response signal to the first server responsive to a first command received from the first server, and that acquires a status of the apparatus, and
a second transmitter that transmits a response signal based on the acquired status of the apparatus to the first server responsive to a second command received from the first server.

2. The system according to claim 1, wherein the first transmitter transmits, as the command, data obtained by extracting predetermined information from the voice.

3. The system according to claim 1, wherein the first command is a command indicating that the apparatus is to be operated.

4. The system according to claim 1, further comprising a voice output device that outputs a voice, wherein
the output part provides, to the voice output device, an output based on a response signal as voice data, and
the voice output device outputs the voice data as a voice.

5. The system according to claim 4, wherein
the apparatus is an image forming apparatus, and
the voice output device outputs a status of the image forming apparatus as a voice.

6. The system according to claim 5, wherein the status of the image forming apparatus includes at least one of an error status, capability information, and option information of the image forming apparatus.

7. The system according to claim 1, wherein the second transmitter determines whether the status of the apparatus acquired by the controller is related to the second command and, in a case where the status of the apparatus is related to the second command, transmits a response signal based on the acquired status of the apparatus to the second server.

8. The system according to claim 1, wherein the first server determines whether the status of the apparatus acquired by the controller is related to the second command, transmits the second command to the apparatus in a case where the status of the apparatus is not related to the second command, and refrains from transmitting the second command to the apparatus in a case where the status of the apparatus is related to the second command.

9. The system according to claim 1, wherein the second transmitter determines whether the status of the apparatus acquired by the controller is related to the second command and, in a case where the status of the apparatus is related to the second command, transmits display information based on the acquired status of the apparatus to the apparatus.

10. A processing apparatus connectable to an apparatus and a server capable of receiving a command, the processing apparatus comprising:
a second receiver that receives a command from the server;
a controller that, responsive to a first command received from the server, transmits a response signal to the server and acquires a status of the apparatus; and
a second transmitter that, responsive to a second command received from the server, transmits a response signal based on the acquired status of the apparatus to the server.

* * * * *